United States Patent [19]

Ueno et al.

[11] Patent Number: 4,651,561
[45] Date of Patent: Mar. 24, 1987

[54] ACCELERATION DETECTING DEVICE FOR A TURBOCHARGER SYSTEM AND METHOD OF OPERATION

[75] Inventors: Takashi Ueno; Toshimi Abo, both of Yokosuka, Japan

[73] Assignee: Nissan Motor Co., Ltd., Yokohama, Japan

[21] Appl. No.: 734,149

[22] Filed: May 15, 1985

[30] Foreign Application Priority Data

May 15, 1984 [JP] Japan .................................. 59-95479

[51] Int. Cl.⁴ ...................... F02B 37/12; G01M 15/00
[52] U.S. Cl. ........................................ 73/115; 60/602
[58] Field of Search ....................... 73/115, 116, 118; 60/600, 601, 602, 603

[56] References Cited

U.S. PATENT DOCUMENTS 3,994,160 11/1976 Hanson ................................... 73/116
4,046,003 9/1977 Armstrong et al. ................... 73/118
4,459,808 7/1984 Rydquist et al. ..................... 60/602

FOREIGN PATENT DOCUMENTS 146023 9/1982 Japan ..................................... 60/602
58-180726 10/1983 Japan ..................................... 60/602

Primary Examiner—Michael Koczo
Attorney, Agent, or Firm—Schwartz, Jeffery, Schwaab, Mack, Blumenthal & Evans

[57] ABSTRACT

A turbocharged engine having a pressure detector for detecting the supercharged air pressure and the instant when the pressure exceeds a first given value and a second higher given value. Decision means responsive to the signals from the pressure detecting means determine the time which is required for the supercharged pressure to increase from the first to the second given value and for deciding the existence of an acceleration when the elapsed time is less than a reference time interval.

3 Claims, 8 Drawing Figures

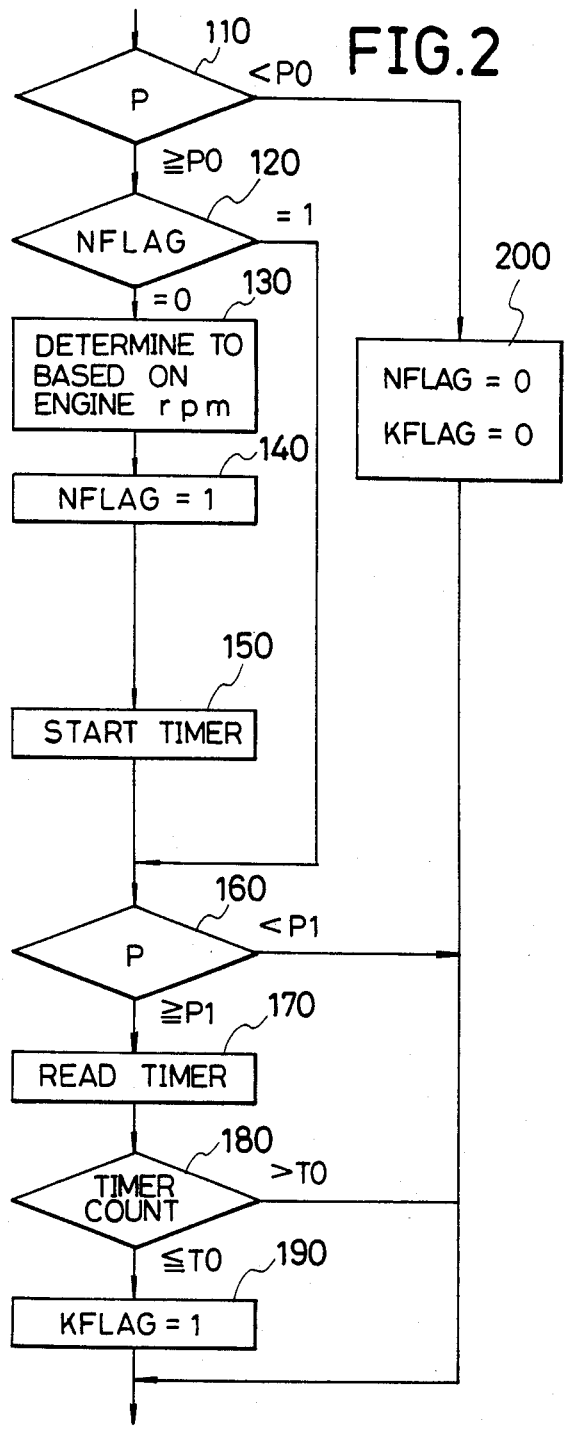

ACCELERATION DETECTING DEVICE FOR A TURBOCHARGER SYSTEM AND METHOD OF OPERATION

BACKGROUND OF THE INVENTION

1. Technical Field

The invention relates to a turbocharger system including a turbine which is driven for rotation by an exhaust gas from an engine to drive a compressor for controlling a supercharged pressure of an intake air supplied to the engine, and more particularly, to an acceleration detecting device for the turbocharger system which provides an accurate and reliable detection of the acceleration.

2. Related Art

A turbocharger system includes a waste gate valve which controls the bypassing of an exhaust gas supplied to a turbine from an engine. If a supercharged pressure supplied to the engine exceeds a given value, such pressure operates the waste gate valve to open, thereby preventing the supercharged pressure of intake air supplied to the engine from exceeding a given normal value to thereby protect the engine. However, in consideration of the strength limits of various parts used in the engine, a supercharged pressure in excess of a normal value can be tolerated if it persists for a reduced length of time. Accordingly, during an accelerating phase, a solenoid valve which controls the waste gate valve is subject to a duty control to increase the particular point of the supercharged pressure at which the waste gate valve is opened, thereby providing an overboost control in which the supercharged pressure supplied to the engine is temporarily increased beyond its normal value, thus improving the accelerating performance of a vehicle on which the engine is mounted. If the overboost control is allowed to continue for an increased length of time, an excessive load will be applied to the engine, giving rise to the likelihood that the engine may be damaged. Accordingly, the supercharged pressure is returned to the normal value after a given time interval.

The determination of an acceleration is of importance in this process. A technique is proposed, as disclosed in Japanese Publication of Unexamined Patent Application No. 180,726/1983, for example, in which the determination is based on the position of a throttle valve, by seeing if it passes through a given opening which is very close to a full opening. However, this technique can only be used when the acceleration takes place under nearly fully open condition, and the determination is difficult to achieve for a partial acceleration. Thus, the overboost control in such region is disabled, resulting in an accelerating performance which is less than desired.

As an alternative, the acceleration may be determined by using a rate of change in the supercharged pressure in the increasing direction. However, when the supercharged pressure is detected by a sensor which is directly mounted on the engine, noises from the engine or the condition of combustion within the engine cause the measured supercharged pressure output to change rapidly up and down rather than providing a smooth curve. Hence it is difficult to obtain a reliable rate of change in the supercharged pressure in the increasing direction within a reduced length of time.

Another problem relates to the retarded determination of the acceleration when the supercharged pressure increases rapidly. Thus, the maximum supercharged pressure may be reached before the overboost control is initiated. Consequently, there may be a time period when the overboost control is not effective during the early stage which is significant in the accelerating process.

SUMMARY OF THE INVENTION

In view of the foregoing, it is an object of the invention to provide an acceleration detecting device for turbocharger system which accurately and reliably determines an acceleration.

The above object is accomplished by an acceleration detecting device according to the invention which comprises supercharged pressure detecting means for detecting the supercharged pressure of an intake air supplied to an engine, pressure rise detecting means for detecting an increase in the supercharged pressure detected beyond a first and a second higher value of supercharged pressure, and decision means responsive to a signal from the pressure rise detecting means to determine a time length elapsed since the detected supercharged pressure has exceeded the first value until it reaches the second value and for determining an acceleration in accordance with the length of the time elapsed.

BRIEF DESCRIPTION OF THE DRAWINGS

These and other aspects and advantages of the invention will become apparent by reference to the following detailed description of preferred embodiments when considered in conjunction with the accompanying drawing.

FIG. 2 shows a flow chart illustrating the operation of one embodiment of the invention;

DESCRIPTION OF EMBODIMENT

Figure 1:
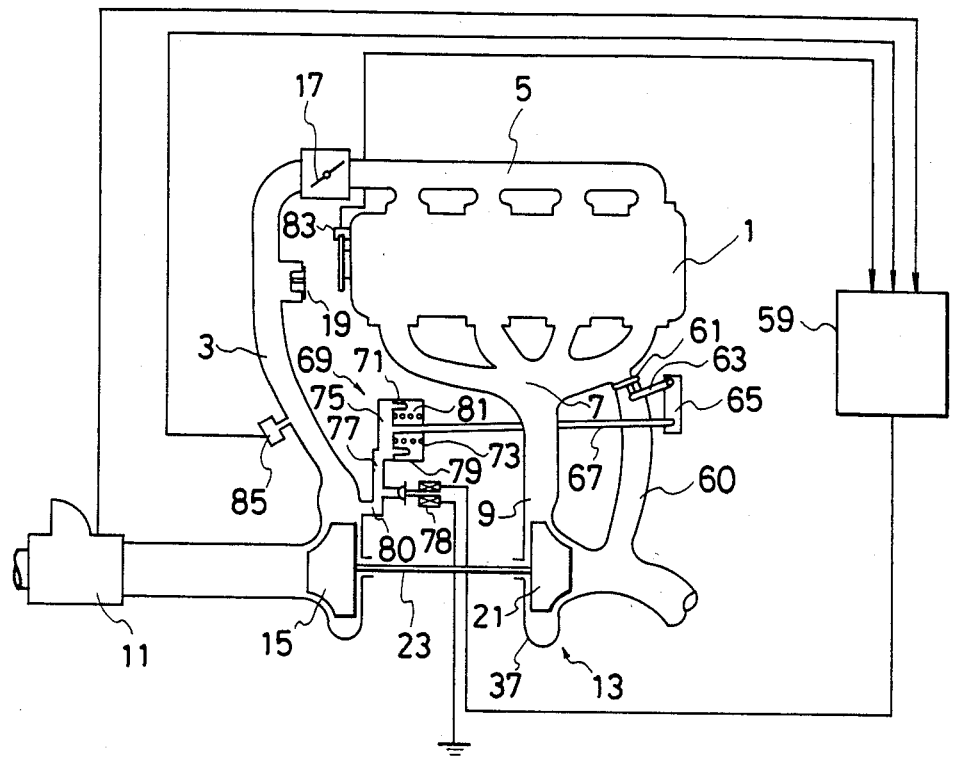
FIG. 1 is a schematic view of a turbocharger system to which the invention is applied.

Referring to FIG. 1, there is shown one embodiment of the invention. An engine 1 is supplied with air through an intake pipe 3 and an intake manifold 5 while an exhaust gas is displaced therefrom through an exhaust manifold 7 and an exhaust pipe 9. The intake pipe 3 includes an end, folded to the left, as viewed in FIG. 1, in which an airflow meter 11 is disposed to determine the amount of intake air. Disposed in the bend of the intake pipe 3 is a compressor 15 which forms part of a turbocharger 13 and which compresses the intake air supplied through the airflow meter 11 before it is supplied to the engine 1. A throttle valve 17 is disposed in the end of the intake pipe 3 located adjacent to the intake manifold 5, and a relief valve 19 and a supercharged pressure sensor 85 are disposed in an area of the intake pipe 3 located between the valve 17 and the compressor 15.

The exhaust pipe 9 has a bend folded to the right, as viewed in FIG. 1, formed therein, in which a turbine chamber 37 is defined, housing a turbine 21 therein. The turbine 21 is connected to the compressor 15 through an interconnecting shaft 23.

An exhaust gas bypass passage 60 is connected to and is located below the exhaust manifold 7 at the right-hand portion thereof, and has an inlet in which a waste gate valve 61 is disposed. The waste gate valve 61 is connected through an arm 63 and a connecting member 65 to one end of an operating rod 67, the other end of which is connected to a diaphragm 71 of a valve actuator 69. The diaphragm 71 is housed within a casing 79, the interior of which is divided into an atmospheric chamber 73 and a positive pressure chamber 75 by the diaphragm 71. A spring 81 is disposed within the atmospheric chamber 73 for urging the diaphragm 71 into the positive pressure chamber 75. The positive pressure chamber 75 is connected through a connecting pipe 77 to the intake pipe 3 at a point downstream of the compressor 15, whereby the supercharged pressure from the compressor 15 is supplied to the chamber 75. An orifice 80 is formed in the inlet of the connecting pipe 77 to the intake pipe 3 so as to provide a smoothing action upon the pressure supplied to the chamber 75. In addition, a solenoid valve 78 is disposed intermediate the length of the connecting pipe 77, and is subject to a duty control by a control unit 59.

The resilience of the spring 81 is adjusted so that such resilience exceeds the effect of the pressure prevailing within the positive pressure chamber 75 when the latter is less than a given value of supercharged pressure. Accordingly, when the supercharged pressure supplied to the chamber 75 through the connecting pipe 77 is less than the given value, the diaphragm 71 is urged into the chamber 75 under the resilience of the spring 81, and such movement is transmitted to the waste gate valve 61 through the operating rod 67, connecting member 65 and arm 63, thus maintaining the valve 61 closed. However, when the pressure input to the chamber 75 exceeds the given value and thus overcomes the resilience of the spring 81, the diaphragm 71 is driven into the atmospheric chamber 73, with result that the waste gate valve 61 is opened to bypass part of the exhaust gas supplied to the turbine 21, thus providing a feedback action which reduces the supercharged pressure and prevents it from exceeding the given value.

When the solenoid valve 78 is subject to a duty control, the valve 78 is opened to a degree depending on the effect of such control, whereby the pressure within the chamber 75 is released to the atmosphere. Accordingly, the pressure within the chamber 75 cannot overcome the resilience of the spring 81 unless the supercharged pressure supplied to the engine increases beyond the given value mentioned above. This means that the duty control of the solenoid valve permits an even higher supercharged pressure, in excess of the given value, to be supplied to the engine, thus providing an overboost control.

The control unit 59 is formed by a microcomputer comprising a microprocessor, a memory and an input/output interface. It receives a signal representing the supercharged pressure p of the intake air supplied to the engine, emitted by the supercharged pressure sensor 85, through the interface. The control unit 59 compares the received supercharged pressure p against a first setpoint pressure P0 and a second setpoint pressure P1. It determines the magnitude of a vehicle acceleration on the basis of a time interval which is required for the supercharged pressure P to increase from the first setpoint P0 to the second setpoint P1. If it determines that an acceleration exists, it applies a duty control of the solenoid valve 78, thus providing an overboost control. It will also be noted that the control unit 59 also receives signals from a crank angle sensor 83 and the airflow meter 11, and utilize such data in the processing operation thereof.

FIG. 2 is a flow chart illustrating the operation of the embodiment. It is to be understood that the processing operation represented by the flow chart is started in response to an interrupt signal which is developed at a fixed time interval, and provides a continuous monitoring of any change in the magnitude of the supercharged pressure P in order to determine the presence of an acceleration.

Initially, the supercharged pressure P detected by the sensor 85 is compared against the first setpoint pressure P0, at step 110, and an increasing supercharged pressure flag NFLAG is checked, at step 120, to see if it is equal to "0" or "1" when the pressure P exceeds the first setpoint pressure P0. The flag NFLAG indicates whether the supercharged pressure P, as it begins to rise, has exceeded the first setpoint pressure P0 and is increasing toward the second setpoint pressure P1. The flag which has a value equal to "0" means that the supercharged pressure P has just exceeded the first setpoint pressure P0, and hence, the program proceeds to a step 130 where the number of revolutions of the engine as detected by the sensor 83 is read at the time when the supercharged pressure P exceeds the first setpoint pressure P0. A reference time interval T0 is determined in accordance with the number of revolutions thus detected for use in determining the vehicle acceleration. At step 140, the flag NFLAG is set to "1", and a timer is started at step 150, and then the program proceeds to a step 160. If the flag NFLAG has a value equal to "1" at step 120, this means that the supercharged pressure P has already passed the first setpoint pressure P0 and the timer has already started. Hence, the program proceeds directly to the step 160.

At step 160, the supercharged pressure P is compared against the second setpoint presure P1. No action takes place if the supercharged pressure P is still less than the second setpoint pressure P1, and this cycle is completed without further processing until the supercharged pressure P is again compared against the second setpoint pressure P1 in response to the next interrupt signal. If it is found that the supercharged pressure P has exceeded the second setpoint pressure P1 as a result of such comparison, a value in the timer is read, and is compared against the reference time interval T0 (steps 170 and 180). If the timer value is less than the reference time interval T0, this means that there has occurred a rapid increase in the supercharged pressure, and a decision is rendered that an acceleration exists, thus setting an acceleration flag KFLAG to "1" at step 190. By a subroutine, not shown, the control unit 59 detects that the acceleration flag KFLAG is set to "1", whereupon it exercises a duty control of the solenoid valve 78 to provide an overboost control which allows a torque output from the engine to be increased for acceleration. If it is found at step 180 that the timer value is greater than the reference time interval T0, the rate of increase in the supercharged pressure is low, and a decision is rendered that an acceleration does not exist, thus terminating the operation of this cycle. If it is found at step 110 that the supercharged pressure P is less than the first setpoint P0, all that is performed during this cycle is to reset the both flags NFLAG and KFLAG to "0".

Figure 3A:
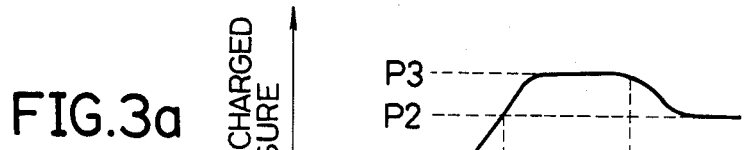
FIG. 3 graphically illustrates an overboost control which takes place in a turbocharger.
Figure 3B:
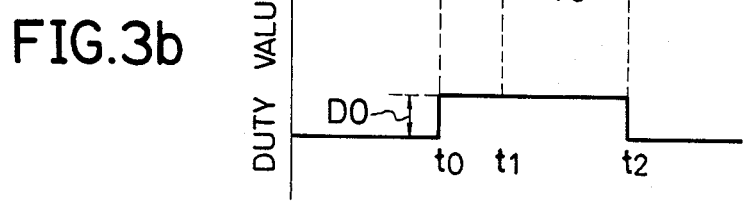

FIG. 3 graphically shows the supercharged pressure during the overboost control and the duty value applied to the solenoid valve in accordance with the invention. When the existence of an acceleration is determined at time $t_0$, a particular duty value which is used to control the solenoid valve is increased by a given amount D0%, as shown in FIG. 3(b). As a consequence, the supercharged pressure increases as indicated in FIG. 3(a), and exceeds a normal supercharged pressure P2 at time $t_1$ and continues to increase to an overboost pressure P3, thus improving the accelerating performance. It will be seen that the supercharged pressure is returned to its normal value after a given time interval T5 since a continued overboost control over an increased length of time may cause an excessive loading upon the engine to damage it.

Figure 4A:
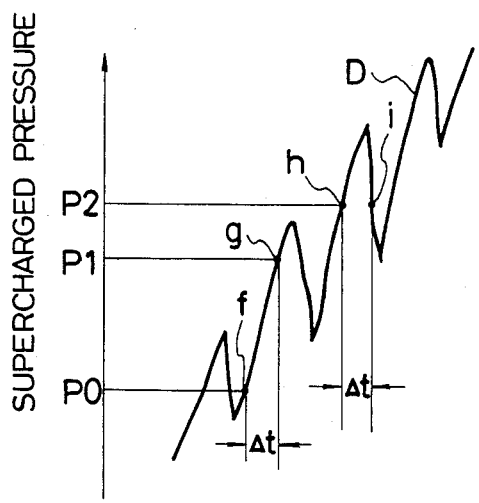
FIGS. 4(a) and 4(b) graphically illustrate an increase in the supercharged pressure which is detected by a supercharged pressure sensor mounted on an engine.

If an acceleration is determined by utilizing a rate of change or increase in the supercharged pressure with respect to time, dP/dt, using a fixed time interval dt rather than relying upon the length of time which is required to produce a change of a given magnitude in the supercharged pressure as effected in the present invention, such rate will be normally detected by a supercharged pressure sensor which is directly mounted on the engine. In such instance, noises of the engine, the conditions of combustion within the engine, the gear shift position or loading upon the engine result in a measured supercharged presure which will be rapidly changing up and down as indicated by a curve D in FIG. 4(a), rather than providing a smooth curve. If the time interval of measurement dt is chosen short or equal to or less than 20 msec and extends between points f and g shown in FIG. 4(a), a rate of change or increase in the supercharged pressure dP/dt =(P1−P0)/dt can be reliably detected, and an acceleration can be determined by seeing if it is greater than $P_{base}$. However, if the interval of measurement extends between points h and i, it follows that dP $\approx$ 0 or dP/dt =(P2−P1)/dt$\approx$0, thus preventing the acceleration from being determined. If it is attempted to solve this problem by choosing an increased length for dt, it follows that for a curve E indicating an increasing supercharged pressure, shown in FIG. 4(b), dP can be accurately detected between points k and m, but for a curve F which illustrates a rapidly increasing supercharged pressure, a decision declaring the existence of an acceleration may be retarded. That is, the maximum supercharged pressure may be reached before the overboost control is initiated. Accordingly, the magnitude of dt cannot be increased during an initial phase of the acceleration.

By contrast, in the present invention, the length of time required for the supercharged pressure to increase from a first value Pa to a second value Pb is chosen as a parameter which is used in the decision in accordance with the invention. By determining the existence of an acceleration depending on the length of time which has elapsed for the supercharged pressure of the intake air supplied to the engine to change from a first to a second value, a decision concerning the existence of an acceleration can be accurately and reliably rendered regardless of a full or partial acceleration. In this manner, a reliable overboost control is assured during a partial acceleration.

Figure 4B:
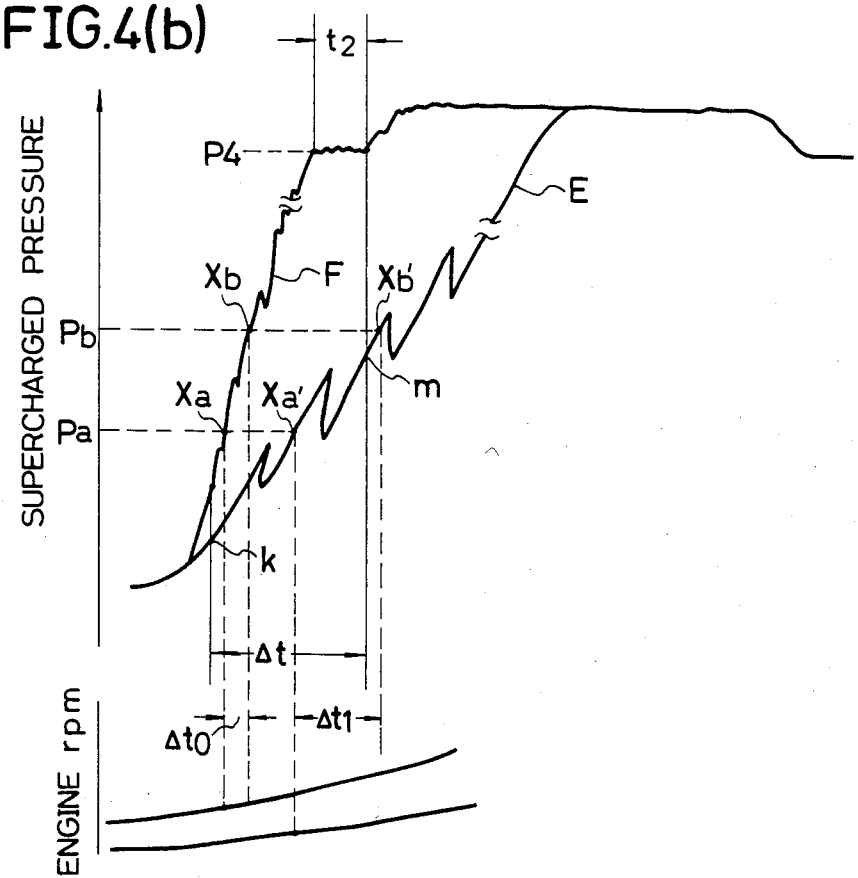
Figure 6:
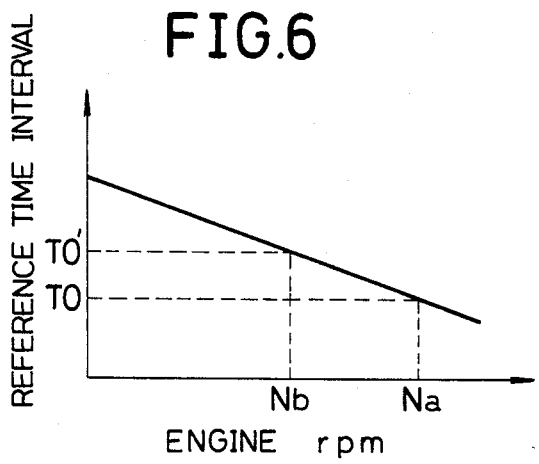
FIG. 6 graphically shows a reference time, which is used to determine an acceleration, plotted against the number of revolutions of the engine.

Specifically, referring to FIG. 4(b), when the invention is applied, the existence of an acceleration is determined at point $x_b$ when the supercharged pressure increases at a high rate, allowing the overboost control to be initiated. When the rate of increase in the supercharged pressure is slow, the existence of an acceleration is determined at point $x'_b$, again initiating the overboost control. In either instance, the reference time interval which is utilized in such decision is determined in accordance with the number of revolutions of the engine at a time when the supercharged pressure has reached Pa, as by utilizing a graph as indicated in FIG. 6, and such reference time interval is compared against dt when the supercharged pressure Pb is reached. In this manner, the invention eliminates a time lag $t_2$ involved in rendering the decision.

Therefore, it will be seen that in accordance with the invention, the time when the decision is rendered changes with the accelerating situation. The decision is given early when the response is rapid, and is given at a later point when the response is slow. In this manner, the overboost control can be reliably and smoothly initiated as intended by a driver, independently from the running condition of the engine.

Figure 5:
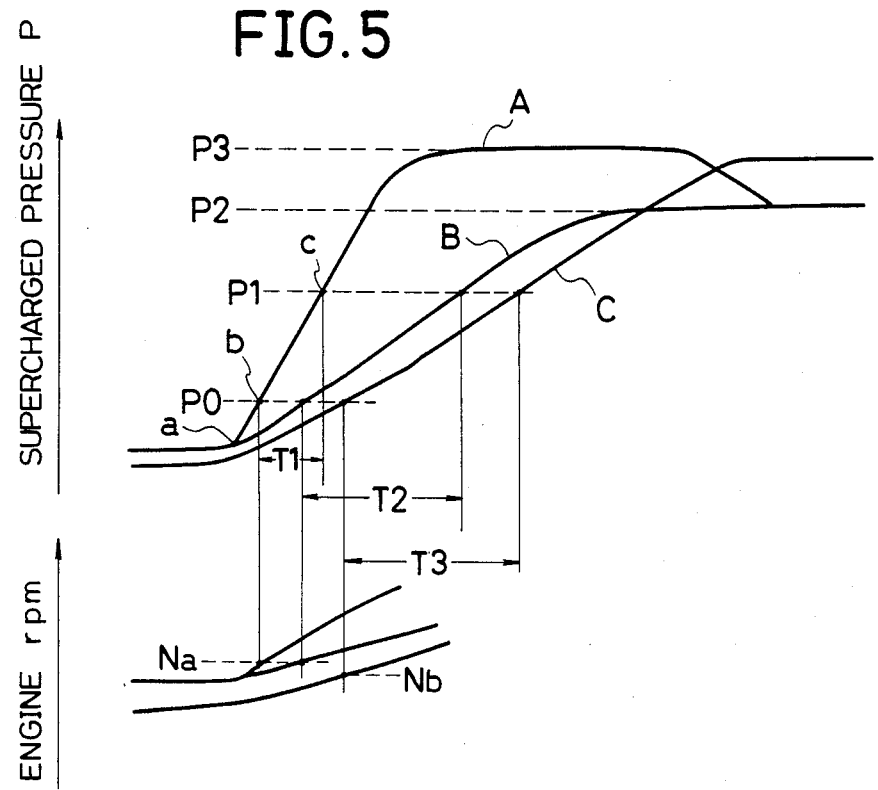
FIG. 5 graphically illustrates curves, representing an increase in the supercharged pressure, which are obtained as a result of using the flow charts illustrated in FIG. 2.

FIG. 5 graphically shows an example of an increasing supercharged pressure P and a varying number of revolutions of the engine during the accelerating phase. As mentioned previously, FIG. 6 graphically plots the reference time interval T0 as a function of the number of revolutions of the engine. In FIG. 5, a curve A represents a rapid acceleration from a fourth speed of about 80 km in the fourth shift range and a curve B a slow acceleration from a fourth speed of about 80 km in the fourth range. In both instances, the acceleration is initiated at point a, and the number of revolutions of the engine Na which prevails when the supercharged pressure P reaches a first setpoint pressure P0 is used to determine a reference time interval T0. Time intervals T1 and T2 which are required until the supercharged pressure P reaches the second setpoint pressure P1 in the respective instances are determined, and are compared against the reference time interval T0 in order to render a decision concerning the existence of an acceleration. In this example, if the reference time interval T0 is chosen to be between the magnitudes of T1 and T2 or T1 <T0 <T2, it is possible to determine if the acceleration from the same four range speed 80 km is a rapid acceleration which requires an overboost control or a slow acceleration which does not require an overboost control. A curve C represents an increase in the supercharged pressure P which occurs for a rapid acceleration from the fourth range speed 40 km. In this instance, the reference time interval corresponding to the number of revolutions of the engine Nb which prevails when the supercharged pressure P reaches the first setpoint pressure P0 may be chosen greater than the reference time interval for the number of revolutions Na, as indicated in FIG. 6, so that when a time interval T3 required for the supercharged pressure P to reach the second setpoint pressure P1 is compared against the reference time interval T0', such that T3 <T0'. In this manner, again, it is possible to render a decision that an acceleration exists. It will be appreciated from FIG. 5 that the existence of an acceleration can be determined at any gear shift position in accordance with the invention.

In the embodiment described above, the time interval T0 which is used in the decision of an acceleration is determined on the basis of the number of revolutions of the engine at the time when the supercharged pressure P has exceeded the first setpoint pressure P0. Alternatively, such interval can be determined in accordance with the operating condition of the engine such as a gear shift position or a vehicle speed, rather than the number of revolutions of the engine.

While preferred embodiments of this invention have been shown and described, it will be appreciated that other embodiments will become apparent to those skilled in the art upon reading this disclosure, and, therefore, the invention is not to be limited by the disclosed embodiments.

What is claimed is:

1. An acceleration detecting device for a turbocharger system compising means for detecting a supecharged pressure of intake air supplied to an engine, and for detecting when the supercharged pressure exceeds a first given value and a second, higher given value, and decision means responsive to signals from the pressure detecting means for determining a length of time which is required for the supercharged pressure to increase from the first to the second given value and for deciding the existence of an acceleration in accordance with the length of the time elapsed, said decision means comprising calculation means for calculating a reference time interval for use in deciding the existence of said acceleration, based on an engine condition which prevails when the supercharged pressure reaches the first given value, and comparator means for comparing the time elapsed against the reference time interval and deciding the existence of said acceleration when the time elapsed is less than the reference time interval.

2. A method for detecting an acceleration in a turbocharger system comprising the steps of detecting a supercharged pressure of intake air supplied to an engine, detecting when the supercharged pressure as detected exceeds a first given value and a second, higher given value, and determining a length of time which is required for the supercharged pressure to increase from the first to the second given value, and deciding the existence of said acceleration in accordance with the length of the time elapsed, said step of deciding the existence of the acceleration comprises declaring the existence of the acceleration when the time elapsed is less than a reference time interval.

3. The method of claim 2, wherein said step of determining the length of time comprises calculating a reference time interval which is to be used in the decision of an acceleration, based on an engine condition which prevails when the supercharged pressure reaches the first given value, and comparing the time elapsed against the reference time interval.

* * * * *